United States Patent [19]

Kozlowski

[11] 4,157,833
[45] Jun. 12, 1979

[54] SEALING RING WITH DIAMETER INDICIA

[75] Inventor: Peter F. Kozlowski, Billerica, Mass.

[73] Assignee: A. W. Chesterton Company, Stoneham, Mass.

[21] Appl. No.: 856,524

[22] Filed: Dec. 1, 1977

[51] Int. Cl.² .............................................. F16J 15/00
[52] U.S. Cl. .......................................... 277/9; 277/1; 277/11; 277/124; 285/93; 285/4
[58] Field of Search ..................... 277/1, 9, 9.5, 10, 11, 277/124, 198, 216, 217, 218, 219, 220–222; 285/3, 4, 93

[56] References Cited

U.S. PATENT DOCUMENTS

| 1,942,704 | 1/1934 | Hubbard et al. | 277/11 |
| 2,665,151 | 1/1954 | Fisler et al. | 277/124 |
| 2,706,655 | 4/1955 | Showalter | 277/124 |
| 3,521,890 | 7/1970 | Holmes et al. | 277/59 X |
| 3,955,673 | 5/1976 | Fosness | 277/9 X |

FOREIGN PATENT DOCUMENTS

| 2141758 | 3/1973 | Fed. Rep. of Germany | 285/93 |
| 684106 | 3/1930 | France | 277/1 |

Primary Examiner—Robert S. Ward, Jr.

[57] ABSTRACT

An elastomeric sealing ring having a V-shaped configuration, the wall connecting the legs of the V lying in the plane of the ring, is provided with diameter indicia formed in the wall, the indicia equidistantly circumferentially spaced along an arc segment of the wall and the distance between indicia corresponding to a predetermined portion of the ring inner diameter.

9 Claims, 5 Drawing Figures

SEALING RING WITH DIAMETER INDICIA

This invention relates to elastomeric rings and more particularly to sealing rings which typically are split for assembly to a shaft.

Sealing rings for hydraulic and pneumatic applications, such as rods and pistons, typically are continuous rings which are cut to facilitate assembly on the rod or piston. Numerous sizes of rings are typically stocked for application to various machine element sizes. When an odd size is required, however, which is not readily available, the next larger ring is cut down to size. Because of the need for relatively accurate cutting, to assure a proper sealing function, the cutting to reduce ring size is normally done at a factory on a mandrel of the desired final size.

It is a principal object of this invention to eliminate the need for use of a mandrel and to thus facilitate cutting down a ring size in the field. It is a further object of this invention to reduce the number of sizes of rings normally stocked.

In general the invention features an elastomeric sealing ring having ring diameter indicia circumferentially spaced along an arc segment of the surface of one wall of the ring. It has been found that up to about 20 percent of the ring circumference may be removed without adverse effect on the ring function. The indicia facilitate cutting down the ring in the field without use of a mandrel.

In a preferred embodiment the indicia are integral raised portions of the wall surface and are equidistantly spaced, the distance between indicia corresponding to a predetermined portion of the ring inner diameter. The indicia are raised no more than about 0.002 inch and extend over an arc segment comprising at least 20 percent of the wall circumference. The ring has a generally V-shaped configuration, the indicia positioned on the surface of the wall joining legs of the V, the wall lying in the plane of the ring. Initially the ring is continuous. The cuts to reduce ring size comprise a pair of radially extending angular cuts at two of the indicia.

Other objects, features and advantages of this invention will be apparent to those skilled in the art from the following detailed description of a preferred embodiment thereof, taken together with the accompanying drawings, in which.

Figure 1:
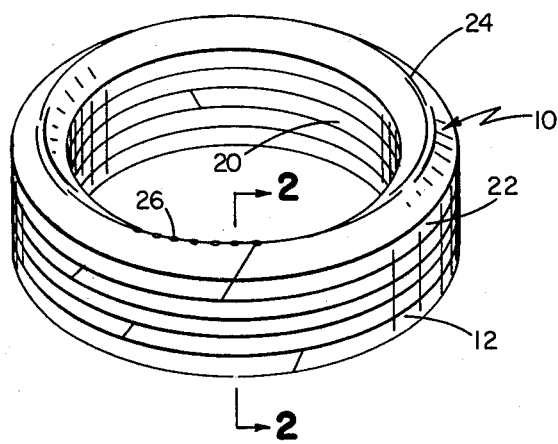
FIG. 1 is an isometric view of a stack of rings embodying the invention.
Figure 2:
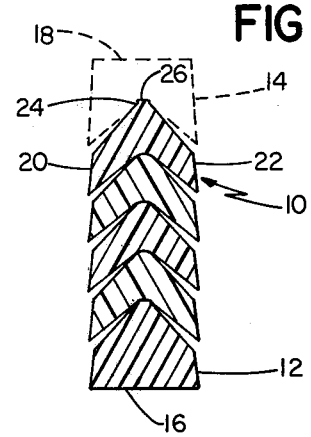
FIG. 2 is an enlarged section taken along the line 2—2 of FIG. 1 and illustrating in phantom an upper ring typically employed in the ring stack.

As shown in FIGS. 1 and 2, the hydraulic/pneumatic sealing rings 10 have a V-shaped configuration which permits stacking the rings. In use a lower ring 12 and an upper ring 14, shown in phantom in FIG. 2, are employed in the stack having, respectively, flat lower and upper walls 16, 18. The legs 20, 22 of the V in each ring define the inner and outer annular walls of the ring and the wall 24, connecting the legs of the V, lies in the plane of the ring.

Figure 3:
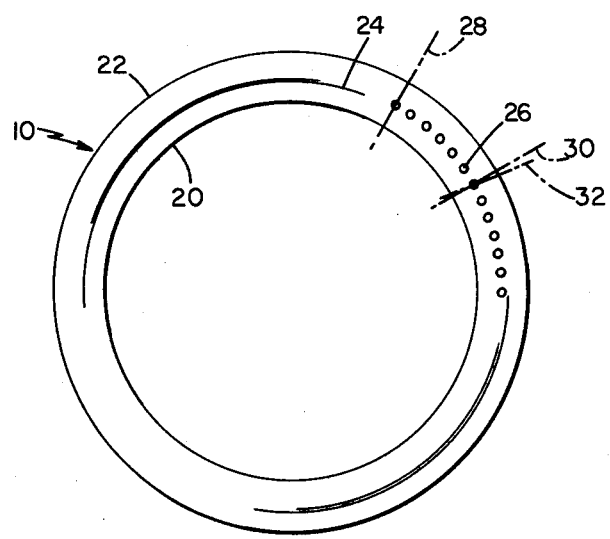
FIG. 3 is a plan view of a ring prior to cutting.

As best shown in FIG. 3, along an arc segment of wall 24 a plurality of ring diameter indicia 26 are provided. The indicia 26 comprise a plurality of raised spots, shown in FIGS. 2 and 5, raised not more than about 0.002 inch to prevent interference with the sealing function, the spots integral with wall 24. The spots 26 extend along a segment comprising at least about 20 percent of the circumference of wall 24. The spots are equidistantly spaced from each other by a distance corresponding to a predetermined portion of the ring inner diameter, e.g., for markings corresponding to 0.062 inch or about 1/16 inch on the ring diameter, the indicia are spaced apart so that the distance between radial lines extending through adjacent indicia is about 0.195 inch at the inner wall 20 of the rings. The indicia are provided on each ring.

Figure 4:
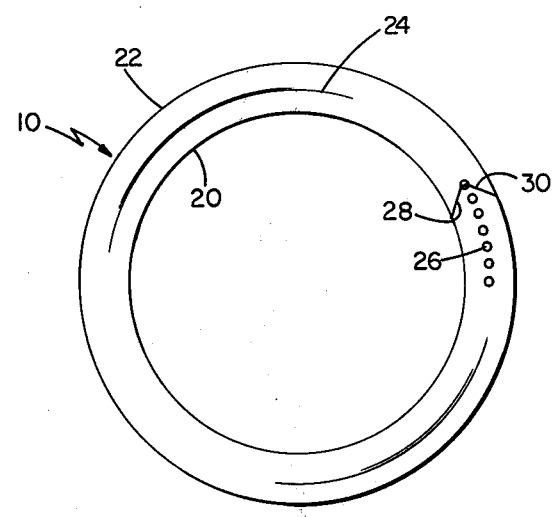
FIG. 4 is a plan view of a ring after it is cut down.
Figure 5:
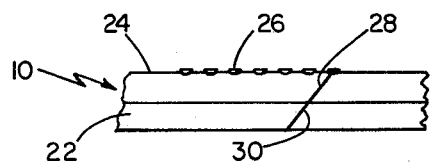
FIG. 5 is a fragmentary side elevation of the ring of FIG. 4.

Initially, the ring is molded as a continuous annulus. To cut the ring to reduce its diameter a first cut is made along a radial line 28 extending through one of the indicia, as shown in FIG. 3, the cut being made at a 45° angle to the plane of the ring. A second cut is made along a radial line 30 at a second indicia to remove a segment of the ring, up to 20 percent of the ring diameter and circumference. The cut ends of the ring are then butted, as shown in FIGS. 1, 4 and 5, when installed in machinery. For rings having a relatively wide cross section, the second cut may be made on a line 32 at a slight angle, e.g., 1°–3°, to the radial to compensate the cut surfaces so they will butt properly when the ring is closed.

Advantageously, the indicia allow accurate reductions in ring diameter rendering the use of mandrels unnecessary and permitting cutting down the ring diameter in field locations. Because relatively large segments of the rings may be thus accurately removed in the field, it is unnecessary to have a large stock of different size rings in the field.

Other embodiments of this invention will occur to those skilled in the art which are within the scope of the following claims.

What is claimed is:

1. A sealing ring of elastomeric material characterized in that a plurality of ring diameter indicia are integrally formed in and equidistantly spaced along an arc segment of the surface of a wall of said ring, the distance between indicia corresponding to a predetermined portion of the ring diameter.

2. The sealing ring claimed in claim 1 further characterized in that said indicia are raised portions of said wall surface.

3. The sealing ring claimed in claim 2 further characterized in that said indicia are raised above said wall surface a distance not greater than about 0.002 inch.

4. The sealing ring claimed in claim 1 further characterized in that said arc segment comprises at least about 20 percent of the circumference of said wall.

5. The sealing ring claimed in claim 1 further characterized in that said ring in section has a generally V-shaped configuration, the legs of said V defining inner and outer walls of said ring and said legs joined by a third wall lying in the plane of said ring, said third wall defining said surface along which said indicia are positioned.

6. The sealing ring claimed in claim 5 further characterized in that said indicia are formed in said third wall surface and are spaced a distance corresponding to a predetermined portion of the ring inner diameter.

7. The sealing ring claimed in claim 6 further characterized in that said ring comprises a continuous annulus.

8. The sealing ring claimed in claim 6 further characterized in that said arc segment comprises at least about 20 percent of the circumference of said wall.

9. The sealing ring claimed in claim 6 further characterized in that said ring is split by radially extending angular cuts in said arc segment at two of said indicia.

* * * * *